US007680221B2

(12) United States Patent
Lillo et al.

(10) Patent No.: US 7,680,221 B2
(45) Date of Patent: Mar. 16, 2010

(54) ULTRATIGHT NAVIGATION OBSERVATION LOCK DETECTOR

(75) Inventors: Walter Engevald Lillo, Torrance, CA (US); Manorama Gollakota Raghavender, Rancho Palos Verdes, CA (US); John Lukesh, Torrance, CA (US); Randal Kirk Douglas, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 893 days.

(21) Appl. No.: 11/400,140

(22) Filed: Apr. 7, 2006

(65) Prior Publication Data

US 2007/0237269 A1    Oct. 11, 2007

(51) Int. Cl.
*H03D 1/00* (2006.01)
*H04B 1/00* (2006.01)

(52) U.S. Cl. .................. 375/343; 375/142; 375/150

(58) Field of Classification Search .................. 375/316, 375/340, 343, 142, 143, 147, 150, 152
See application file for complete search history.

(56) References Cited

U.S. PATENT DOCUMENTS

| 7,274,504 | B2* | 9/2007 | Crane et al. | 342/357.14 |
| 2003/0058927 | A1* | 3/2003 | Douglas et al. | 375/147 |
| 2007/0118286 | A1* | 5/2007 | Wang et al. | 701/213 |

* cited by examiner

*Primary Examiner*—David B Lugo
(74) *Attorney, Agent, or Firm*—Ocean Law; Paul D. Chancellor

(57) ABSTRACT

An observation lock detector receives I and Q correlations and measurement residuals and transforms the I and Q quadrature correlation outputs based upon computed code phase and carrier phase into transformed I and Q quadrature signals communicated to conventional output lock detectors to provide validity and confidence indicator signals for indicating that the residual estimates are valid for dynamic propagation of the residuals in a navigation receiver for improved performance especially in low signal-to-noise environments such as for use in an ultratight GPS navigation system.

18 Claims, 6 Drawing Sheets

OBSERVATION LOCK DETECTOR

GPS INERTIAL NAVIGATION SYSTEM

FIG. 1

NAVIGATION PROCESSOR
FIG. 2

OBSERVATION LOCK DETECTOR
FIG. 3

I & Q MAXIMIZER
FIG. 4

I & Q MAXIMIZER LOOK UP TABLE
FIG. 5

ROTATION MATRICES GENERATOR
FIG. 6

ULTRATIGHT NAVIGATION OBSERVATION LOCK DETECTOR

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of ultratight navigation systems. More particularly the present invention is related to GPS ultratight coupling navigation receivers.

BACKGROUND OF THE INVENTION

Navigation systems are increasingly dependent upon the global positioning system (GPS). The navigation receiver should be able to withstand intentional or unintentional signal interference with robust signal acquisition and tracking. For this reason, inertial navigation systems have been coupled to GPS signal tracking and acquisition systems for improved signal tracking and acquisition of the received signal. Inertial navigation systems (INS) have an inertial measurement unit (IMU) for processing inertial measurements. Coupling navigation data with the GPS signal tracking and acquisition system improves signal tracking and acquisition. When the inertial measurements of a navigation processor are used with a GPS signal tracking and acquisition system, the combined system is tightly coupled. The tightly coupled GPS and INS system uses validated pseudorange and pseudorange rate measurements from the GPS receiver instead of the processed position and velocity measurements. In addition, inertial measurement unit data is usually used to assist the receiver tracking loops and enable more noise filtering than would be possible without tracking loop aiding. The tightly coupled method has been used with the validated pseudorange and pseudorange rate measurements. Ultratight coupling systems have been disclosed in U.S. Pat. No. 6,516,021. More recently, ultratight GPS and INS coupling has been proposed which drives all signals from the INS navigation solution for a period of time then examines all signals with respect to the error of the navigation solution. Ultratight receivers do not attempt to control code replicas for exact code phase alignment with the incoming signal but merely seek to observe the deviation of the incoming signal from locally generated replicas and feed that deviation information back to the code replica generators. Ultratight coupling has shown to be more robust in the presence of noise. Ultratight coupling does not require that the replica code track or lock onto the incoming signal. Uncoupled systems, loosely coupled systems, and tightly coupled systems, have conventional lock detectors that are known to validate measurements for improved performance. The output lock detectors measure the performance of the system. However, new ultratight validations and performance metrics have been sought but no proposed metric has been accepted.

A tracking loop is a combination of electronic hardware and software algorithms used to track a pseudorandom noise (PRN) code signal and the signal carrier. A tracking loop that tracks the PRN code is a code-tracking loop. A tracking loop that tracks the carrier is a carrier-tracking loop. The carrier-tracking loop can track the phase or the frequency of the carrier or a combination of both. A carrier-tracking loop design is adjusted to each application by designing the closed loop gains and the order of the filter to obtain the desired filtering and dynamic response. The code-tracking loop attempts to drive the code phase of a replica signal to be aligned with the received signal, so as to enable coherent demodulation of the received signal. The tracking loops include a signal generator that generates an estimated replica signal of the received signal using a control signal that advances or retards in time the code replica signal relative to the received signal. The code-tracking loop includes a correlator that multiplies the received signal by the code replica signal and passes the multiplied signal result through a low pass filter. The code-tracking loop includes a discriminator generator that generates a discriminator signal having a value related to the difference between the received signal and the replica signal. The code-tracking loop also includes a controller that filters the discriminating signal into the control signal that is then communicated to the signal generator.

A fundamental function in all GPS receivers built to date is the ability of the receiver to generate a code replica signal of the received signal transmitted by a satellite that can be correlated with the code of the received signal being received from the satellite. The code replica signal is advanced or retarded until the locally generated replica signal correlates with the received code in a receiver. For loosely or tightly coupled GPS and INS systems, the code-tracking loop is performed by code and carrier-tracking loops that determine an error signal that is a measure of the range and range rate difference between the generated and received signals. That difference between the received and replica signal is an error signal that is processed by a transfer function for generating input values communicated to a numerically controlled oscillator to advance or retard the generated code replica signal. When the code replica signal correlates with the received code, the tracking loop is in lock and the feedback error signal is near zero. When the code and carrier tracking loops are in lock, the state of the code and carrier generation process can be sampled to obtain a measure of the pseudorange and pseudorange rate. The pseudorange is the geometric range between the transmit antenna and receive antenna plus a bias due to the user clock error. The pseudorange rate is approximated by the amount of range change for a predetermined amount of time plus a bias due to the drift of the local oscillator frequency.

The pseudorange and pseudorange rate measurements are predicated upon the assumption that the replica is aligned with the incoming signal. Lock detectors are used to determine when the carrier and code replicas are coherently aligned with the incoming signal in terms of code phase by a code lock detector, of the carrier frequency by a frequency lock detector, and of the carrier phase by a phase lock detector. When the code lock detector indicates that the code of the replica is in lock with the received signal, then the pseudorange measurement, derived from an instantaneous sampling of the state of the code generator at a desired measurement epoch time, is considered valid. When the frequency lock detector indicates that the carrier frequency is in lock with the carrier phase of the received signal, then the pseudorange rate measurement is considered valid. The pseudorange rate measurement is obtained by strobing the carrier replica twice over a small period of time and determining the change in carrier phase or delta pseudorange over a discrete period of time. In the limit, as the time interval goes to zero, the ratio of the delta pseudorange divided by delta time approaches the instantaneous time rate of change of the pseudorange, which rate of change is the pseudorange rate.

Lock detectors improve navigation performance for loosely and tightly coupled systems, because the lock detectors prevent bad measurements from being sent to the integration Kalman filter. In addition to improving navigation performance, the signal to noise levels at which a receiver loses code lock, carrier frequency lock, and carrier phase lock are used as measures of receiver performance.

The code-tracking loops that track the incoming satellite received signal must adjust the phase and the frequency of the generated replica signal for many changing variables, such as user and satellite relative motion and user clock drifts. These tracking loops are traditionally called the code loop and the carrier loop, because the code loop tracks the phase of the pseudorandom noise (PRN) code and the carrier loop tracks the signal carrier frequency and the carrier phase. Although a phase locked loop is the most common way to track a carrier signal, the GPS signals have a fifty hertz navigation data message superimposed on the code generation process, which can potentially change the phase of the signal by 180° every twenty milliseconds. To avoid a loss of lock during this change of phase, a Costas tracking loop is used in place of the conventional phase lock loop. This allows the carrier to be tracked across 50 Hz data bit changes with no loss of lock. Frequency lock loops are also used for the carrier tracking and sometimes are used in combination with phase lock loops to improve robustness. When the tracking loop error builds beyond a certain threshold value, the loop is deemed to be out of lock and pseudorange and pseudorange rate measurements are not used until the loop reacquires lock.

Ultratight coupling generates all replicas based on a single navigation estimate for a period of time called an epoch. The replicas are not required to precisely track the incoming signal during the epoch but must remain within about a chip to ensure the signal is in view. The correlation outputs for every signal from a satellite are modeled by a function of the error between the navigation state estimate and the true navigation state, total electron content error $\Delta TEC$, and error rate $\Delta TEC'$. These errors are then estimated based on examination of the correlation outputs. Ultratight coupling has been shown to be a more effective way of processing GPS and IMU signals in the presence of noise, and has resulted in improved estimates of the ionospheric effects. Ultratight systems can use information from other satellites to propagate a replica of a satellite that might momentarily be obscured, and hence can quickly reacquire a signal without going through a lengthy acquisition process. There are problems during detection when a particular satellite is giving poor information or when identifying when an ultratight system is not receiving valid information from GPS signal processing. Because ultratight receivers do not lock onto the incoming signal, lock detectors cannot be applied to the correlation outputs to determine the validity of estimates. The validity of the estimates is not determined. As such, invalid estimates can be passed to the integration Kalman filter as measurements. The integration Kalman filter will have no way of determining when the measurements are invalid. The integration Kalman will apply the invalid measurements resulting in a degraded navigation estimate. The degraded navigation estimate can cause one or more replicas to be out of the field of view of the signal resulting in greatly reduced navigation performance. Because ultratight systems never lock onto the signal, the signal to noise ratio at which the receiver falls out of lock cannot be applied as a performance metric. Ultratight navigation systems disadvantageously lack an ability to quantify performance and determine when incoming signal observations are valid. These and other disadvantages are solved or reduced by the present invention.

SUMMARY OF THE INVENTION

An object of the invention is to provide validity indications for indicating when residual estimates are valid.

Another object of the invention is to provide validity indications for indicating when residual estimates are valid using noise estimates and quadrature correlations.

Yet another object of the invention is to provide validity indications for indicating when residual estimates are valid using noise estimates and quadrature correlations in an ultratight coupled system.

Yet a further object of the invention is to provide validity indications for indicating when residual estimates are valid using noise estimates and quadrature correlations in an ultratight coupled GPS navigation system.

Yet a further object of the invention is to provide an observation lock detector for providing validity indications for indicating when residual estimates are valid using noise estimates and quadrature correlations in an ultratight coupled GPS navigation system.

Still a further object of the invention is to provide an observation lock detector for providing validity indications for indicating when residual estimates are valid using noise estimates and quadrature correlations with the residuals rotating the correlations for maximizing one of the correlations for conventional lock detection of the maximized correlation for providing the validity indications.

An observation lock detector receives quadrature correlations, such as early, prompt, and late I and Q quadrature correlations from a correlator, as well as residual estimates from a prefilter, and noise estimates from a noise estimator for generating validity signals and generates indicators indicating the validity of the residual estimates. The indicator signals when valid may be used in a navigation system for dynamically propagating the error state vector and the clock error estimates for continuous tracking of carrier and code phases with residual updates. The indicator signals when invalid may be used in a navigation system for statically propagating the error state vector and the clock error estimates for continuous tracking of carrier and code phases without residual updates.

The observation lock detector transforms the I and Q quadrature correlations outputs based upon the residual estimates so that conventional output lock detectors provide the validity signals for indicating that the residual estimates are valid. The observation lock detector can improve a GPS navigation receiver performance in low signal-to-noise environments and be applied to ultratight GPS navigation systems. The validity signals are preferably communicated to an integration filter in a navigation processor so that the integration filter does not use invalid residual estimates when computing a navigation solution and tracking the carrier phase and code phase. The ratio of the signal power to the noise power at which the validity signals indicate invalid estimates can be used as a measure of performance of an ultratight system. These and other advantages will become more apparent in the detailed description of the preferred embodiment.

DETAILED DESCRIPTION OF THE PREFERRED EMBODIMENT

Figure 1:
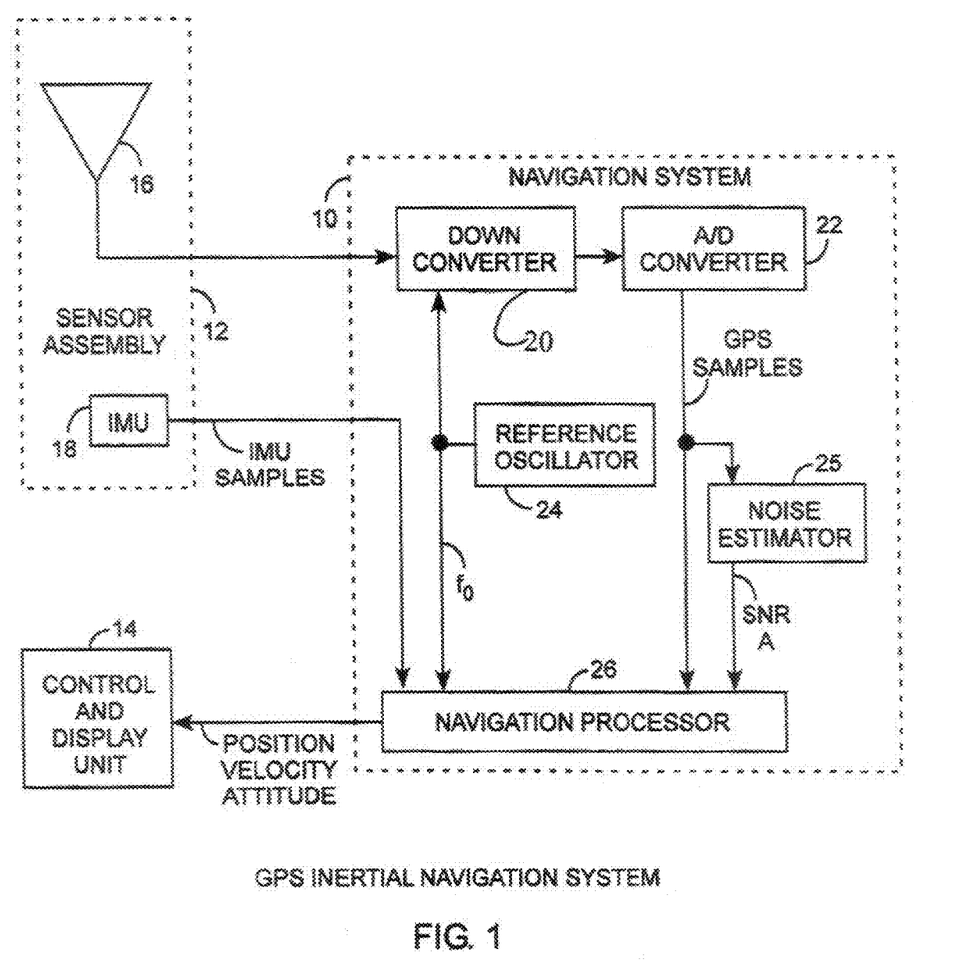
FIG. 1 is a block diagram of a GPS inertial navigation system.

An embodiment of the invention is described with reference to the figures using reference designations as shown in the figures. Referring to FIG. 1, a global positioning system (GPS) inertial navigation system includes a navigation system 10 receiving GPS signals and inertial measurement unit samples from a sensor assembly 12 and provides position and velocity data to a control and display unit 14. The navigation system 10 functions as a GPS inertial navigation system tracking GPS signals from a plurality of in-view satellites, not shown. The sensor assembly 12 includes an antenna 16 for receiving and providing received GPS signals and includes an inertial measurement unit (IMU) 18 providing the IMU sample signals, both of which signals are communicated to the navigation system 10. In the preferred form, the IMU 18 may be a microelectromechanical system (MEMS) IMU embedded in the antenna 16. The navigation system 10 includes a downconverter 20 for frequency downconversion of the received GPS signals using a reference oscillator 24 providing an $f_o$ internal frequency reference. The system 10 includes an analog-to-digital (A/D) converter 22 communicating digitized GPS samples to a navigation processor 26 and to a noise estimator 25 that computes from the GPS samples a signal to noise ratio SNR and provides an estimated amplitude A. The noise estimator 25 sends the noise estimates SNR and A to the navigation processor 26. The navigation processor 26 also receives the IMU samples from the IMU 18 an internal frequency reference $f_o$ from the reference oscillator 24 and GPS samples from the A/D converter 22 and provides the position and velocity data to the control and display units 14.

Figure 2:
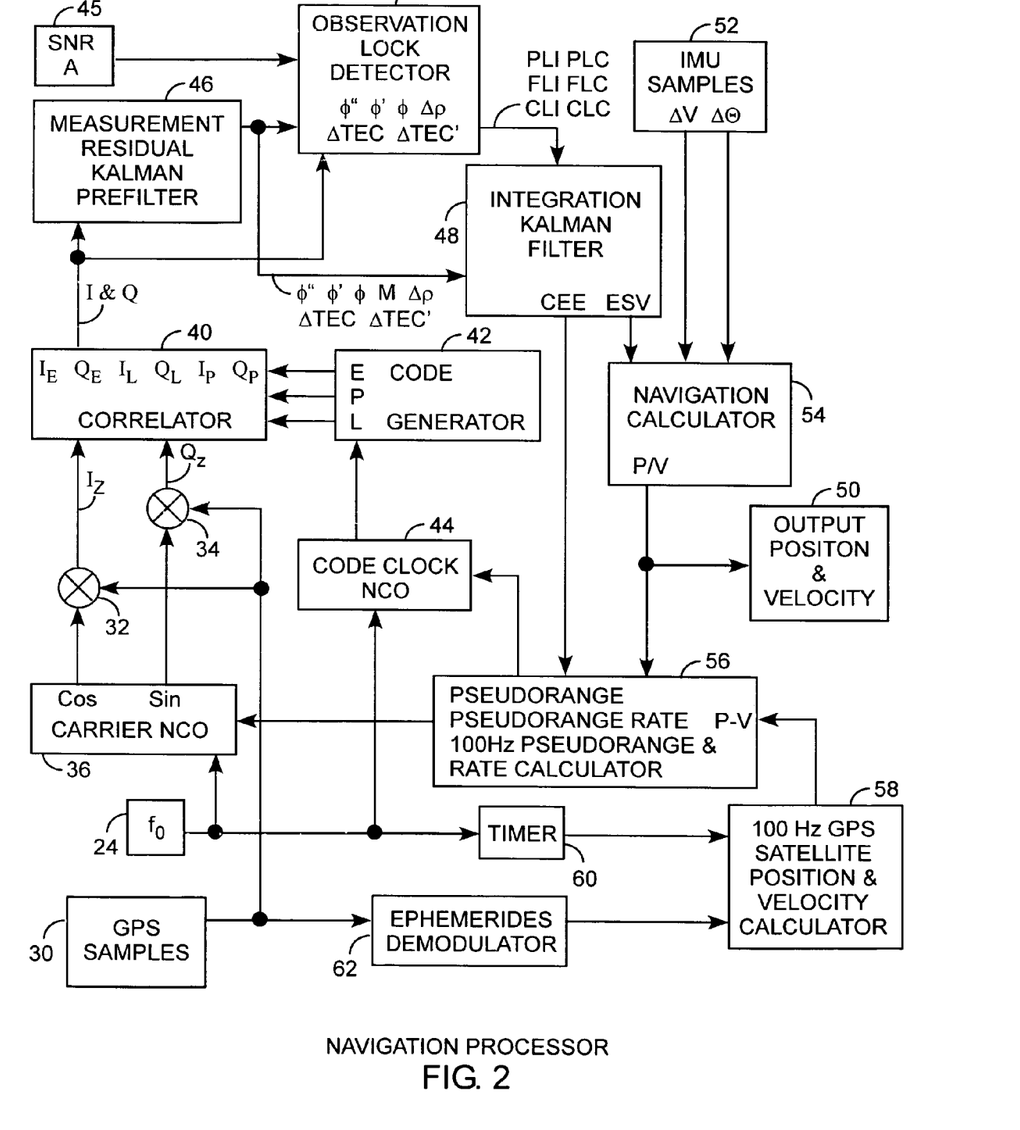
FIG. 2 is a block diagram of a navigation processor.

Referring to FIGS. 1 and 2, and more particularly to FIG. 2, the navigation system 10 includes a navigation processor 26 receiving the digitized GPS samples 30 that are communicated to mixers 32 and 34. The mixers 32 and 34 provide demodulated inphase $I_Z$ and quadrature $Q_Z$ signals as demodulated quadrature signals respectively using cos and sin demodulation signals from a carrier numerically controlled oscillator (NCO) 36 using a $f_o$ reference oscillator 24. The cos and sin demodulation signals are replica carrier signals for carrier demodulating the received GPS samples 30. The $I_Z$ and $Q_Z$ demodulated quadrature signals are received by a correlator 40 also receiving early E, prompt P, and late L code replica signals from a chipping code generator 42 receiving a chipping code clocking signal from a code clock NCO 44. The correlator may operate at 50.0 Hz. The correlator 40 provides inphase and quadrature, early, prompt, and late $I_E$, $Q_E$, $I_L$, $Q_L$, $I_P$, and $Q_P$ correlation signals that are communicated to a measurement residual Kalman prefilter 46. The correlations may be communicated at 50.0 Hertz to the measurement residual Kalman prefilter 46 having a 1 Hertz output. The measurement residual prefilter 46 computes the pseudorange error $\Delta\rho$, the pseudorange rate error $\Delta\dot{\rho}$, the pseudorange acceleration error $\Delta\ddot{\rho}$ as well as the carrier phase $\phi$, the carrier frequency $\phi'$, and the carrier phase acceleration $\phi''$. The pseudorange rate $\dot{\rho}$ is the first derivative time rate of the change of the pseudorange $\rho$. The pseudorange acceleration $\ddot{\rho}$ is the second derivative time rate of change of the pseudorange $\rho$. The measurement residual prefilter 46 also computes total electron content error $\Delta TEC$ and error rate $\Delta TEC'$ as part of a residual estimates vector. The prefilter 46 also computes a measurement covariance matrix M indicating the uncertainties in the residual estimates vector for a number of samples m over a major cycle epoch time T. The residual estimates vector outputs $\phi$, $\phi'$, $\phi''$, $\Delta\rho$, $\Delta TEC$, $\Delta TEC'$ are communicated to the observation lock detector 47. The residual estimates vector outputs $\phi$, $\phi'$, $\phi''$, $\Delta\rho$, $\Delta TEC$, $\Delta TEC'$, and M are communicated to a large integration Kalman filter 48 that may have a one-second major cycle time period between Kalman filter epochs. The observation lock detector 47 also receives the noise estimates SNR and A from the noise estimator 25. The observation lock detector 47 provides a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC. All of the indicators are communicated to the integration Kalman filter 48. By way of example, the carrier phase validity indicator PLI has a value of 1 when the carrier phase error estimate $\phi$ is considered valid and has a value of 0 when invalid. The observation lock detector 47 outputs the phase validity confidence PLC that takes a value between 0 and 1 indicating a confidence level of PLI. The observation lock detector 47 also outputs the carrier frequency validity indicator FLI that has a value of 1 when the carrier frequency $\phi'$ is valid and has a value of 0 when invalid. The observation lock detector 47 also outputs a carrier frequency confidence indicator FLC. The observation lock detector 47 also outputs a code validity indicator CLI that has a value of 1 when the pseudorange error estimate $\Delta\rho$ is valid. The observation lock detector 47 also outputs a code confidence indicator CLC. For the confidence indicators PLC, FLC and CLC, an output of 0 corresponds to no confidence and an output of 1 corresponds to certainty. For the validity indicators PLI, FLI, and CLI, an output of 1 indicates a valid lock and an output of 0 indicates an invalid lock.

The integration Kalman filter 48 receives PLI, PLC, FLI, FLC, CLI, and CLC indicators as inputs. The integration Kalman filter 48 in turn repetitively provides estimates of position and velocity errors in an error state vector ESV that is used by the navigation calculator 54 to compute the output P/V position and velocity data 50 communicated to the control unit 14. The $\Delta V$ and $\Delta\theta$ IMU samples 52 and the error state vector ESV are communicated to the 100 Hz inertial navigation calculator 54 that computes the best estimate of the navigation state vector solution defined by P/V position and velocity data. The P/V position and velocity data 50 is calculated from the IMU samples 52 and the error state vector ESV. At the end of each of the one-second major cycle, the integration Kalman filter 48 updates the ESV and then communicates the ESV to the navigation calculator 54. The IMU samples 52 are repetitively generated, for example, at one hundred times a second. The samples 52 include the differential velocity samples $\Delta V$ and the differential attitude samples $\Delta\theta$ that are communicated to the 100 Hz inertial navigation calculator 54 also receiving the error state vector ESV every second from the integration Kalman filter 48. The P/V position and velocity data 50 is communicated to the 100 Hz pseudorange and pseudorange rate calculator 56 that in turn provides pseudorange rate estimate to the carrier code NCO 36 and provides a pseudorange estimate to the code NCO 44. The pseudorange and pseudorange rate calculator 56 also receives calculated GPS satellite position and velocity data P-V from a 100 Hz GPS satellite position and velocity calculator 58. The calculator also receives user clock error estimates CEE from the integration Kalman filter 48. The satellite P-V data references the GPS satellite calculated position and velocity. The clock error estimates CEE include a clock phase error and clock frequency error that is the time derivative of the clock phase error. The calculated pseudorange estimate is equal to the geometric line of sight range to a satellite adjusted by the clock phase error estimates CEE and certain signal propagation compensation terms, such as the nominal ionosphere and troposphere delays. The pseudorange rate estimate is equal to the relative geometric velocity to the satellite from the user antenna 16 plus the clock frequency error estimate. The GPS satellite position and velocity calculator 58 receives timing signals from a timer 60 using the $f_o$ reference 24 and receives demodulated ephemeris data from an ephemeris demodulator 62 using the GPS samples 30 to compute the P-V GPS position and velocity data.

The correlation process of the correlator 40 is based upon the early E, prompt P, and late L code replicas generated by the code generator 42, and upon the carrier replica generated by the carrier NCO 36. As the pseudorange estimates and pseudorange rate estimates from the calculator 56 are refreshed during each one hundred hertz cycle, the replica carrier cos and sin signals from the NCO 36 and the early E, prompt P, and late L code replicas are adjusted. The correlator 40, operating at 50.0 Hz for example, enables conventional early, prompt, and late correlations by providing the early, prompt, and late I and Q quadrature correlations to the Kalman prefilter 46 as $I_E$, $Q_E$, $I_P$, $Q_P$, $I_L$, and $Q_L$ correlations. The I and Q quadrature correlations are used to estimate the residual estimates vector. The carrier and code phase of the replica signals as compared to the received GPS samples 30 have offsets, that is, phases, also known as phase errors. The carrier and code phases are used to estimate the residual estimates vector including the carrier phase $\phi$, the carrier frequency $\phi'$, the carrier phase acceleration $\phi''$, the pseudorange error $\Delta\rho$, and $\Delta TEC$ error and $\Delta TEC'$ error rate from the prefilter 46.

Figure 3:
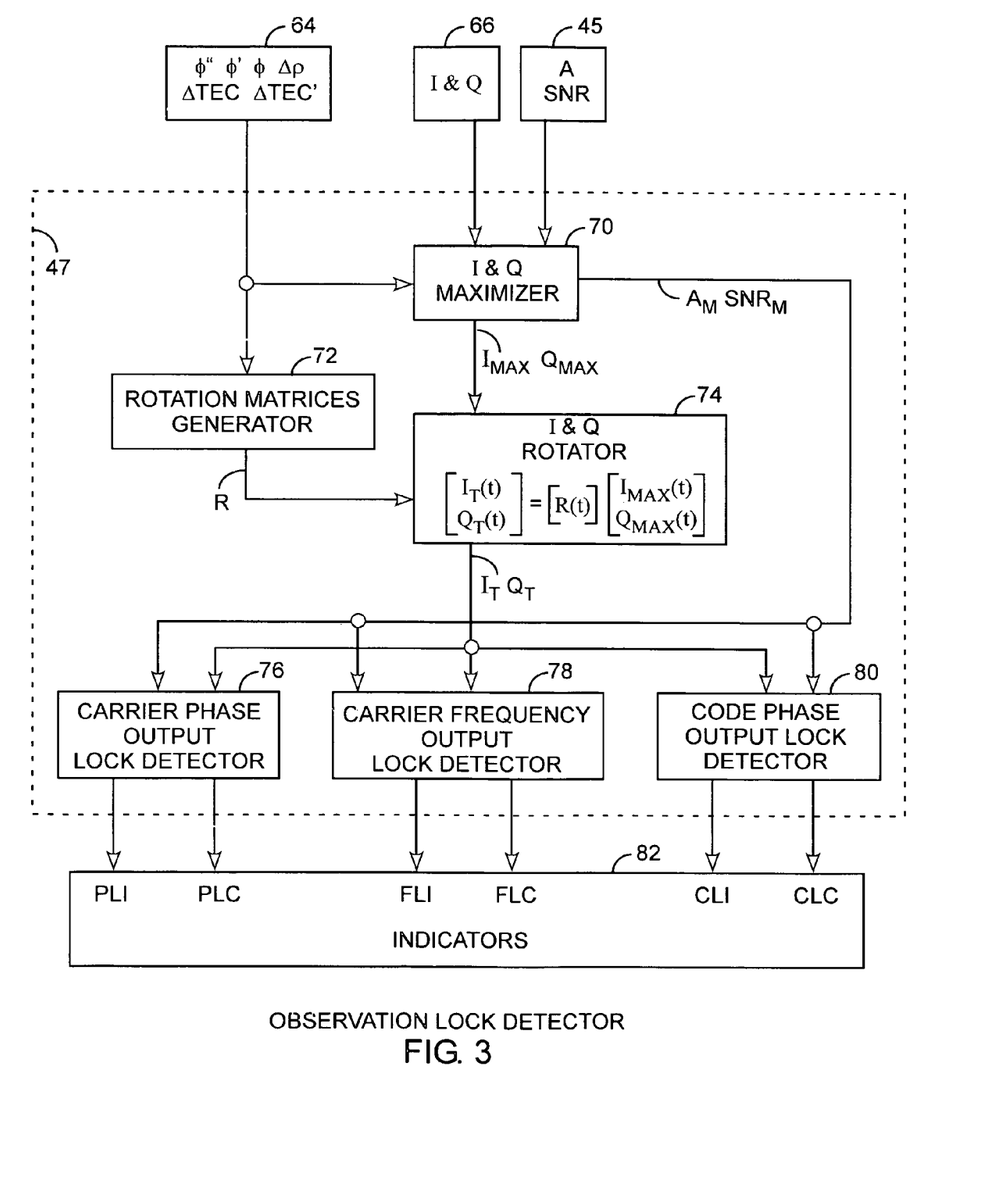
FIG. 3 is a block diagram of an observation lock detector.

Referring to FIGS. 1, 2, and 3, and more particularly to FIG. 3, the residual estimates vector $\phi$, $\phi'$, $\phi''$, $\Delta\rho$, $\Delta TEC$, and $\Delta TEC'$ from the prefilter 46 is communicated to the observation lock detector 47 for generating indicators. The observation lock detector 47 includes an I&Q maximizer 70 that receives the residual estimates vector including the measurements $\phi$, $\phi'$, $\phi''$, $\Delta\rho$, $\Delta TEC$, and $\Delta TEC'$ signals 64 from the prefilter 46. The observation lock detector also receives the SNR and A noise estimates 45 from the noise estimator 25. The observation lock detector also receives the $I_E$, $Q_E$, $I_P$, $I_L$, and $Q_L$ correlations 66 from the correlator 40. The maximizer 70 generates an $I_{MAX}$ and $Q_{MAX}$ maximized vector by combining weighted sums of $I_E$, $I_P$, and I correlations into the maximized inphase vector $I_{MAX}$ and by combining weighted sums of $Q_E$, $Q_P$, and $Q_L$ correlations into a quadrature maximized vector $Q_{MAX}$. The weights $W_1$, $W_2$, and $W_3$ are chosen so that the $I_{MAX}(t)$ and $Q_{MAX}(t)$ maximized quadrature signals have a maximum signal to noise ratio. The I&Q maximizer 70 also generates modified noise estimates $SNR_M$ and $A_M$. The modified noise estimates $SNR_M$ and $A_M$ are scalars. The observation lock detector 47 further includes a rotation matrices generator 72 that receives the residual estimates vector including $\phi$, $\phi'$, $\phi''$, $\Delta\rho$, $\Delta TEC$, and $\Delta TEC'$. The generator 72 generates a rotational matrix array R. The rotational matrix array R is communicated to a rotator 74 for rotating in reverse the maximized vector $I_{max}$ and $Q_{max}$ an amount equal to the carrier phase error $\phi$ for generating $I_T$ and $Q_T$ transformed vector. The $I_T$ and $Q_T$ transformed vector and the modified noise estimates $SNR_M$ and $A_M$ are then communicated to conventional lock detectors 76, 78, and 80. A carrier phase output lock detector 76 provides the PLI and PLC indicators. A carrier frequency output lock detector 78 provides the FLI and FLC indicators. A code lock output detector 80 provides the CLI and CLC indicators. The output lock detectors 76, 78, and 80 provide a PLI, PLC, FLI, FLC, CLI, and CLC indicator vector 82 indicating the validity and confidence of the carrier phase $\phi$, carrier frequency $\phi'$, and code phase that is related to the pseudorange error $\Delta\rho$.

The integration Kalman filter 48 receives the indicator vector 82 including the PLI, PLC, FLI, FLC, CLI, and CLC indicators from the observation lock detector 47 along with the prefilter residual estimates vector and the covariance matrix M from the measurement prefilter 46 for propagating the CEE and ESV outputs. A conventional Kalman filter 48 is modified to process the measurement error vector conditioned upon the validity and confidence of the indicators of the indicator vector 82. The carrier phase measurement $\phi$ is processed when only PLI and PLC indicators indicate that the carrier phase measurement $\phi$ is valid with a predetermined confidence. Carrier frequency $\phi'$ is processed when FLI and FLC indicators indicate that the carrier frequency measurement $\phi'$ is valid with a predetermined confidence. The pseudorange error $\Delta\rho$ is processed when the CLI and CLC indicators indicate that pseudorange error measurement $\Delta\rho$ is valid with a predetermined confidence. The code phase error is equal to the pseudorange error $\Delta\rho$ minus a correction for $\Delta TEC$. The clock estimates CEE and error state vector ESV outputs of filter 48 are adjusted as the carrier phase $\phi$, carrier frequency $\phi'$, and pseudorange error $\Delta\rho$ vary. When the indicators 82 indicate invalid or low confidence in the carrier phase $\phi$, carrier frequency $\phi'$, and pseudorange error $\Delta\rho$, the CEE and ESV are statically propagated without updates, that is, CEE and ESV are propagated without updates. When the PLI, PLC, FLI, FLC, CLI, and CLC indicators indicate valid and high confidence in the carrier phase $\phi$, carrier frequency $\phi'$, and pseudorange error $\Delta\rho$, the CEE and ESV outputs from the integration Kalman filter 48 are dynamically propagated using updates of the carrier phase $\phi$, carrier frequency $\phi'$, and pseudorange error measurements $\Delta\rho$.

In the preferred form, the dynamic and static propagation of the residuals and CEE and ESV outputs by the integration Kalman filter 48 occurs based upon the validity and confidence PLI, PLC, FLI, FLC, CLI, and CLC vector 82 by predetermined criteria. When the indicators PLI and PLC for carrier phase $\phi$ indicators PLI and PLC are valid with confidence, then the CEE and ESV outputs are dynamically propagated using carrier phase $\phi$, carrier frequency $\phi'$, and pseudorange $\Delta\rho$ residual estimates. When the PLI and PLC indicators for the carrier phase $\phi$ are invalid and FLI and FLC indicators for the carrier frequency $\phi'$ are valid with confidence, the CEE and ESV outputs are dynamically propagated using the carrier frequency $\phi'$ and pseudorange error $\Delta\rho$ residual estimates. When the PLI and PLC indicators for the carrier phase $\phi$ are invalid and the FLI and FLC indicators for the carrier frequency $\phi'$ are invalid, and the indicators CLI and CLC for the code phase are valid with confidence, then the CEE and ESV outputs are dynamically propagated using the pseudorange range error $\Delta\rho$ residual estimate. When the indicators 82 are invalid for the carrier phase $\phi$, the carrier frequency $\phi'$ and code phase, the CEE and ESV outputs are statically propagated without updates using the carrier phase $\phi$ the carrier frequency $\phi'$ and pseudorange error $\Delta\rho$ residual estimates. In this manner, the integration Kalman filter 48 dynamically propagates the CEE and ESV outputs for adjusting tracking of the code phase and carrier phase when the residual estimates are valid with confidence. Otherwise, the integration Kalman filter 48 statically propagates the CEE and ESV outputs for maintaining tracking of the code phase and carrier phase when the residual estimates are invalid. As such, the navigation processor 26 tracks with updates the carrier phase and code phase only when the residual estimates are valid. The ESV output contains an estimated TEC and a position and velocity estimate. The decision to process the residual estimates $\phi$, $\phi'$, and $\Delta\rho$ by the integration Kalman filter 48 is done as in conventional tightly coupled receivers that use outputs from conventional lock detectors to determine when to process the pseudorange range error $\Delta\rho$, carrier phase $\phi$, and carrier frequency $\phi'$ residual estimates.

The carrier phase lock detector 76 is a conventional carrier phase lock detector that receives as input the $I_T$ and $Q_T$ transformed vector and the modified noise estimates $SNR_M$ and $A_M$. The carrier phase lock detector 76 outputs an indicator PLI that is 1 when the carrier phase is in lock and 0 when not in lock. The carrier phase lock detector 76 outputs the indicator PLC that takes a value between 0 and 1 expressing the confidence in the correctness of the value of indicator PLI. The carrier frequency lock detector 78 is a conventional carrier frequency lock detector that receives as input the $I_T$ and $Q_T$ transformed vector and the modified noise estimates $SNR_M$ and $A_M$.

The carrier frequency lock detector 78 outputs the indicator FLI that is 1 when the carrier frequency is in lock and 0 when not in lock. The carrier frequency lock detector 78 outputs the indicator FLC that takes a value between 0 and 1 indicating the confidence in the correctness of the value of indicator FLI. The code lock detector 80 is a conventional code lock detector that receives as input the $I_T$ and $Q_T$ transformed vector and the modified noise signal $SNR_M$ and $A_M$. The code lock detector 80 outputs the indicator CLI that is 1 when the code is in lock and 0 when not in lock. The code lock detector 80 outputs the indicator CLC that takes a value between 0 and 1 expressing the confidence in the correctness of the value of the indicator CLI.

The observation lock detector 47 includes a rotation matrices generator 72 that receives the residual estimates vector $\phi$, $\phi'$, $\phi''$, $\Delta\rho$, $\Delta TEC$, $\Delta TEC'$ from the Kalman prefilter 46 for producing the rotational matrix R(t) for each of the N samples where N is the number of samples in an epoch T. The angle of rotation for each correlation corresponds to the estimated carrier phase error $\phi$ as determined from the measurement error vector. Concurrently, the I&Q maximizer 70 receives early, prompt, and late I(t) and Q(t) correlations for each of the N samples in an epoch and stores the correlations outputs in a buffer. After receiving residual estimates $\phi$, $\phi'$, $\phi''$, $\Delta\rho$, $\Delta TEC$, and $\Delta TEC'$ and SNR and A noise estimates 45 from the Kalman prefilter 46 for an epoch, the I&Q maximizer 70 generates an estimate of the code phase offset $\tau(t)$ for each I&Q correlation pair. The I&Q maximizer 70 then linearly combines the early, prompt and late I&Q correlations 66 at each sample point to maximize the signal to noise level at each point. The linear combination maximizes the signal to noise ratio of the $I_{MAX}(t)$ and $Q_{MAX}(t)$ maximized signals. By forming $I_{MAX}(t)$ and $Q_{MAX}(t)$ maximized signals, the maximizer 70 is diminishing the effect of signal power loss when the prompt inphase signal $I_P$ is no longer required to be aligned with the peak. The I&Q maximizer 70 also computes the average signal to noise ratio of $I_{MAX}$ and $Q_{MAX}$ maximized vector by providing the modified $SNR_M$ signal as well as the average signal amplitude $A_M$ of the $I_{MAX}$ and $Q_{MAX}$ maximized signals. The I&Q maximizer 70 outputs $I_{MAX}$ and $Q_{MAX}$ maximized vector for each sample time t and as well as modified noise estimates $SNR_M$ and $A_M$.

The I&Q rotator 74 receives the rotational matrix array R from the rotation matrices generator 72 and receives the $I_{Max}$ and $Q_{Max}$ maximized signals from the I&Q maximizer 70. For each correlation 66 at time t in the epoch T, the I&Q rotator 74 premultiplies a column vector containing $I_{Max}(t)$ and $Q_{Max}(t)$ maximized quadrature signals by a rotation matrix R(t) to produce $I_T(t)$ and $Q_T(t)$ transformed quadrature signals. The I&Q rotator 74 then combines the $I_T(t)$ and $Q_T(t)$ transformed quadrature signals for each sample time t to produce $I_T$ and $Q_T$ transformed vectors. The $I_T$ and $Q_T$ transformed vectors are outputs of the I&Q rotator 74.

Figure 4:
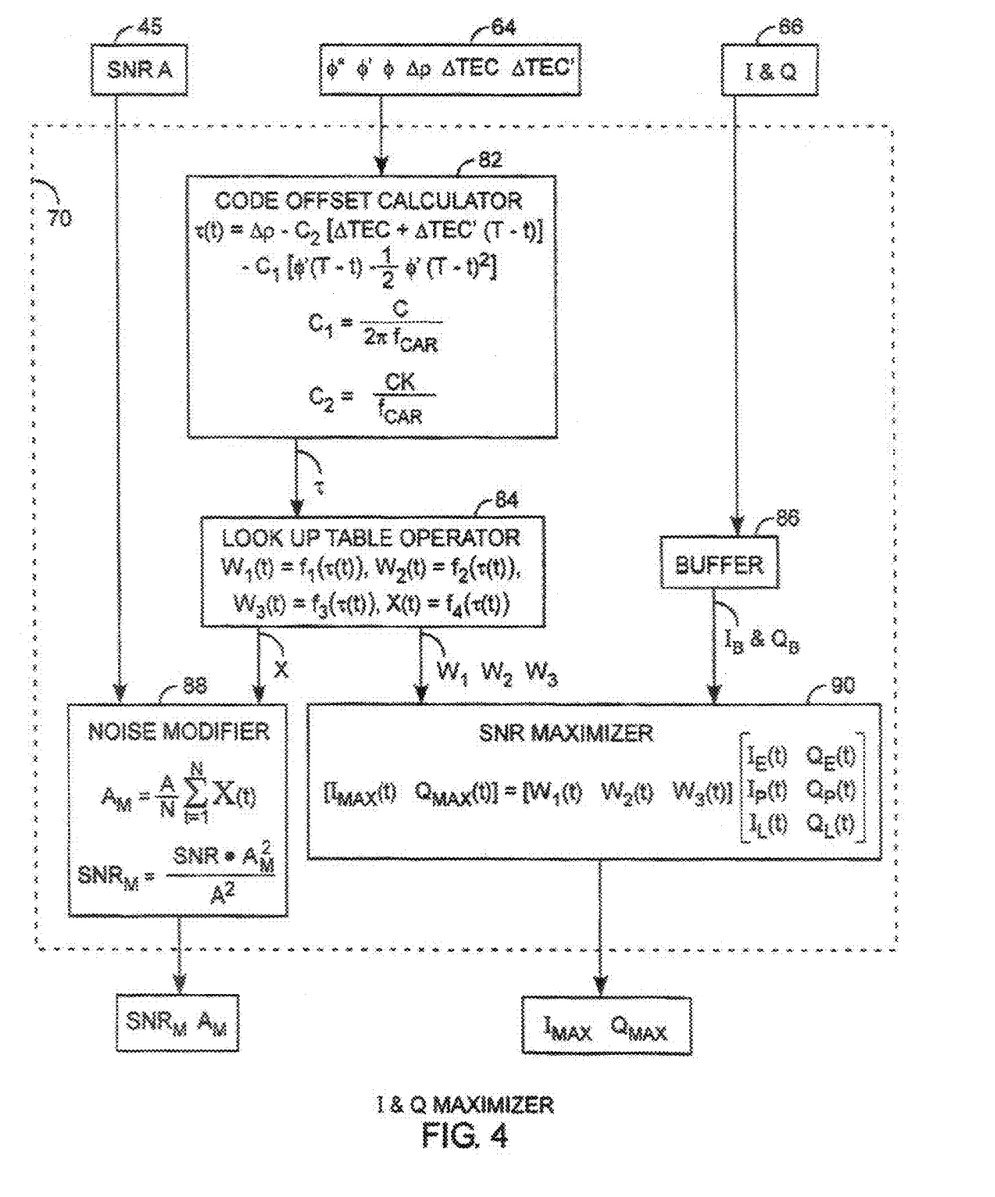
FIG. 4 is a block diagram of an I&Q maximizer
Figure 5:
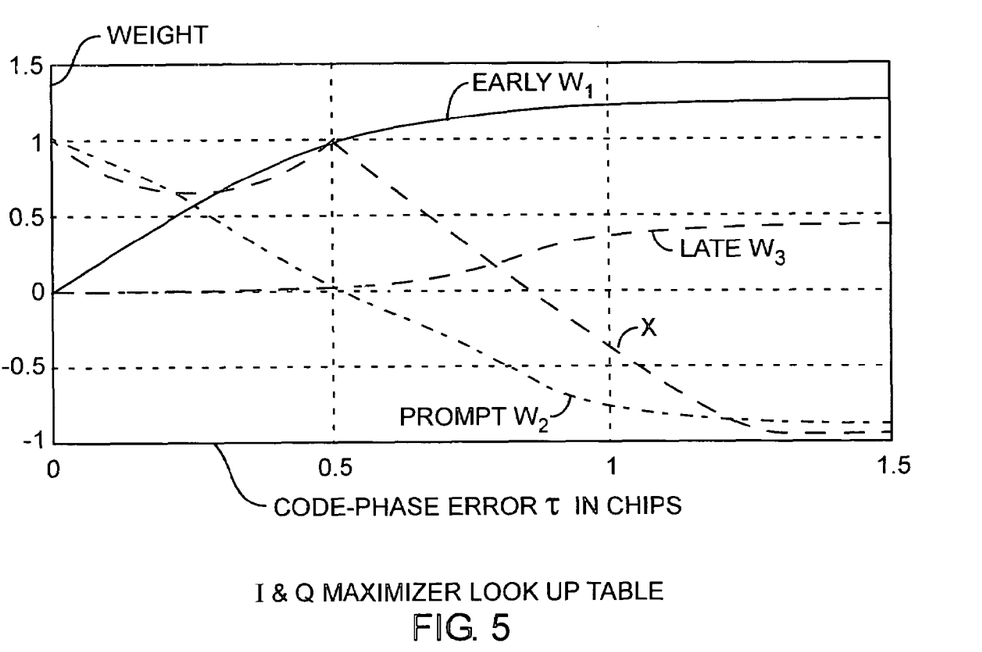
FIG. 5 is a graph of an I&Q maximizer look up table.

Referring to FIGS. 1 through 5, and more particularly to FIGS. 4, and 5 the I&Q maximizer 70 includes a code offset calculator 82 receiving the residual estimates $\phi$, $\phi'$, $\phi''$, $\Delta\rho$, $\Delta TEC$, and $\Delta TEC'$ from the prefilter 46. The code offset calculator 82 computes an estimate of the code phase offset $\tau(t)$ for each sample time t, where $\tau(t)=\Delta\rho-C_2[\Delta TEC+\Delta TEC'(T-t)]-C_1[\phi'(T-t)-(1/2)\ (\phi'(T-t)]$ with $C_1=C/2\pi f_{CAR}$ and $C_2=CK/f_{CAR}$ where C, C1, C2, and are constant and C is the speed of light and $F_{CAR}$ is the carrier frequency. The $I_B$ and $Q_B$ buffered vector containing the estimated code phase offset for all sample times in the epoch is given by a code offset $\tau$. The code offset $\tau$ is the output of the code offset calculator 82. The I&Q maximizer 70 also includes a buffer 86 that receives early, prompt, and late I and Q correlations 66 for an epoch time T and combines the correlations 66 into the buffer $I_B$ and $Q_B$ vector. The $I_B$ and $Q_B$ vector contains all the early, prompt, and late I and Q correlations 66 for the entire epoch. Individual correlations I(t) and Q(t) are buffered as the $I_B$ and $Q_B$ buffered vector. The $I_B$ and $Q_B$ vector containing all the early, prompt, and late I and Q correlations 66 for the entire epoch T are the outputs of the buffer 86.

The I&Q maximizer 70 also includes a look up table operator 84 that receives the code phase offset vector $\tau$ and looks up the early, prompt, and late weights $W_1(t)$, $W_2(t)$, and $W_3(t)$, respectively, that combine the early, prompt, and late I(t) and Q(t) correlations 66 to maximize the signal to noise ratio at each correlation at time t. The I&Q maximizer look up table is used by the look up table operator 84 to determine the weights W1, W2, and W3 respective for early, prompt and late I and Q correlations. The look up table operator 84 also calculates the degradation factor X(t) that indicates the fraction of signal amplitude lost when the prompt replica is not on the peak. The look up table used by the look up table operator 84 is used for determining the degradation factor. The look up table operator 84 outputs the X, $W_1$, $W_2$, and $W_3$ vectors including the degradation factor X and weights W for every sample time t in the epoch T. The I&Q maximizer 70 also includes a SNR maximizer 90 that receives the $W_1$, $W_2$, and $W_3$ weight vectors from the look-up table operator 84 and receives the $I_B$ and $Q_B$ vectors from the buffer 86. The SNR maximizer 90 performs a weighted sum of the early, prompt and late correlations 66 for each sample time t to produce the maximized signals $I_{MAX}(t)$ and $Q_{MAX}(t)$. The individual samples are then stored in the $I_{MAX}$ and $Q_{MAX}$ vector that is an output of the SNR maximizer 90. The $I_{MAX}$ and $Q_{MAX}$ vector is an output of the I&Q maximizer 70. The I&Q maximizer 70 also includes a noise modifier 88 which receives the degradation factor vector X, and the signal to noise ratio SNR, and the amplitude A as inputs and outputs the revised signal to noise ratio $SNR_M$ and the revised amplitude $A_M$. The revised signal to noise ratio $SNR_M$ and the revised amplitude $A_M$ are also outputs of the I&Q maximizer 70, where $SNR_M=SNR\cdot A_M^2/A^2$ and $A_M=(A/N)\Sigma_{t-1}^N X(t)$.

Figure 6:
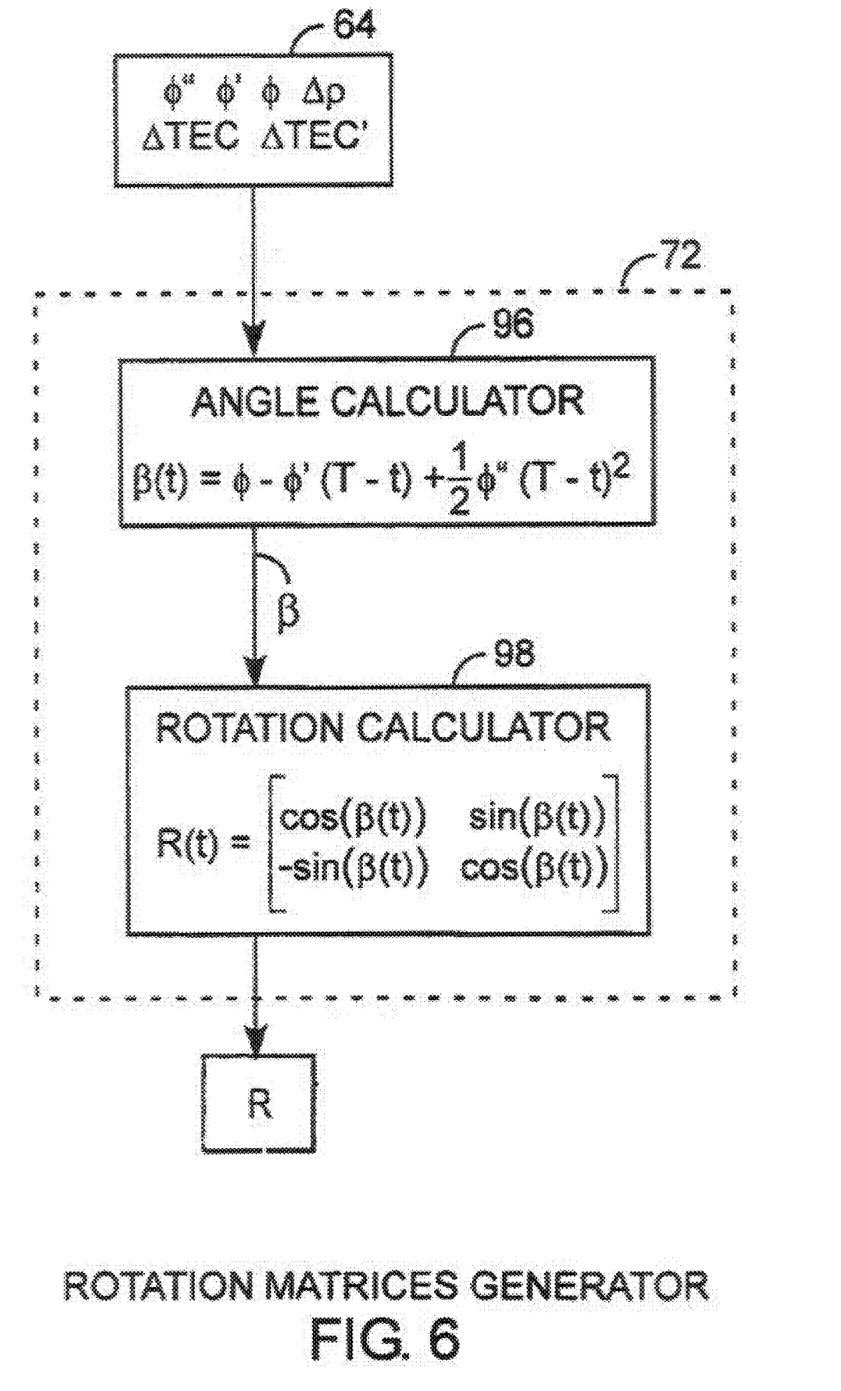
FIG. 6 is a block diagram of a rotation matrices generator.

Referring to all of the Figures, and more particularly to FIG. 6, the rotation matrices generator 72 includes an angle calculator 96 receiving the residual estimates $\phi$, $\phi'$, $\phi''$, $\Delta\rho$, $\Delta TEC$, and $\Delta TEC'$ from the prefilter 46. The angle calculator 96 computes an estimate of the carrier phase offset angle $\beta(t)$ for each sample time t. A carrier phase offset angle vector $\beta$ containing the estimated carrier phase offset angles $\beta(t)$ for all sample times t in the epoch T, is an output of the angle calculator 96 where $\beta(t)=\phi-\phi'(T-t)+(1/2)\ (\phi''(T-t)^2$. The rotation matrices generator 72 also includes a rotation calculator 98, which receives the carrier offset vector $\beta$ as an input.

For each sample time t, rotation calculator 98 generates a rotation matrix R(t) from the estimate of the carrier phase offset β(t). The R(t) rotation matrices are grouped together in the rotational matrix array R as an output of the rotation calculator 98 as well as the rotation matrices generator 72.

In operation, the observation lock detector 70 determines the validity and confidences of the lock indicator vector 82 from estimates of replica carrier phase error φ, replica carrier frequency error φ', and pseudorange error Δρ. These indicators 82 are preferably used by the integration Kalman filter 48 in the navigation processor 26, so that, the invalid residual estimates are not used to dynamically propagate navigation signals, such as clock estimates CEE and error state vector ESV. The CEE and ESV outputs are used to adjust the carrier phase and code phase during coherent carrier demodulation and code despreading of the samples 30. The observation lock detector 70 detects invalid residual estimates from the prefilter 46 so that the integration Kalman filter can ignore residual estimates and/or deweight the residual estimates with low validity confidence levels so that the residual estimates are effectively declared invalid. These indicators 82 can be used as a measurement of performance of an ultratightly coupled navigation system. The observation lock detector 70 can be used to determine the validity of residual estimates of the received correlations 66.

In the rotator 72 computes a carrier phase offset angle β(t). The carrier phase error φ is a carrier phase angle at a time t at the end of an epoch T when T=t. The carrier phase offset angle β(t) is the carrier phase error φ at any time t. That is, the carrier phase offset angle β(t) equals the carrier phase error φ at the end of an epoch. Each matrix R(t) of the rotational array R is defined by respective times t within the epoch. As such, the rotational array R indicates the carrier phase φ over an epoch.

In the maximizer 70, the code phase error τ is determined by the code offset calculator 82 for looking up the weights W and degradation vector X by the look up table operator 84. The look up table is used to determine the weights W and vector X from code phase offset τ. The SNR maximizer 90 then generates the maximized vector $I_{MAX}$ and $Q_{MAX}$ from the buffered correlations $I_B$ & $Q_B$. The $I_{MAX}$ and $Q_{MAX}$ maximized vector has a maximized SNR at each time t. Concurrently, the noise amplitude A is modified into the modified amplitude $A_M$ using the degradation vector X. The modified amplitude $A_M$ represents the degraded amplitude of the I and Q correlations 66. The modified $SRN_M$ is the SNR of the $I_{MAX}$ and $Q_{MAX}$ maximized vector that is averaged over the epoch. The modified amplitude $A_M$ is the average amplitude of $I_{MAX}$ and $Q_{MAX}$ over the epoch. Rotating $I_{MAX}$ and $Q_{MAX}$ maximized vector by the rotational array R removes the carrier phase offset over time t. The $I_T$ and $Q_T$ transformed vector includes maximized $I_{MAX}(t)$ and $Q_{MAX}(t)$ quadrature correlations having the carrier phase offset rotated out so that the $I_T$ inphase maximized vector is maximized and $Q_T$ quadrature maximized vector is minimized.

During precise prompt correlations by the correlator 40, the prompt correlations have a peak prompt SNR. When there is a code phase offset τ between the prompt replica code of the code generator 42 and the spread spectrum code of the $I_Z$ and $Q_Z$ carrier demodulated signals, the prompt correlation amplitude level is degraded form the peak prompt SNR. The modified $SNR_M$ and amplitude $A_M$ are used by the detectors 76, 78, and 80 to restore the amplitudes of the $I_T$ and $Q_T$ transformed vector to the received sample values of SNR and amplitude A for determining indicators 82.

When all of the residual estimates are accurate, that is, valid with high confidence, the $I_T$ inphase transformed vector contains all of the signal power and the $Q_T$ quadrature transformed vector contains no signal power. When the $I_T$ inphase transformed vector contains all of the signal power, the carrier phase output lock detector 76 provides valid and confident indicators PLI and PLC, the carrier frequency output lock detector 78 provides valid and confident indicators FLI and FLC, and the code phase output lock detector 80 provides valid and confident indicators CLI and CLC. When the carrier phase +residual estimate is not accurate, and the carrier frequency φ residual estimate is accurate, and when the $I_T$ inphase transformed vector and the $Q_T$ quadrature transformed vector both contain constant signal power having a sum greater than a predetermined power value that is dependent upon $SNR_M$ and $A_M$, the carrier phase output lock detector 76 provides invalid or unconfident indicators PLI and PLC, the carrier frequency output lock detector 78 provides valid and confident indicators FLI and FLC, and the code phase output lock detector 80 provides valid and confident indicators CLI and CLC. When the carrier phase φ and carrier frequency φ' residual estimates are inaccurate and the pseudorange error Δρ is accurate, and when the sum of the power of $I_T$ inphase transformed vector and the $Q_T$ transformed vector is above the predetermined power value, the carrier phase output lock detector 76 provides invalid and unconfident indicators PLI and PLC, the carrier frequency output lock detector 78 provides invalid and unconfident indicators FLI and FLC, and the code phase output lock detector 80 provides valid and confident indicators CLI and CLC. When all of the residual estimates φ, φ', and Δρ are inaccurate, the carrier phase output lock detector 76 provides invalid and unconfident indicators PLI and PLC, the carrier frequency output lock detector 78 provides invalid and unconfident indicators FLI and FLC, and the code phase output lock detector 80 provides invalid and unconfident indicators CLI and CLC.

The observation lock detector 47 functions to provide the operational indicators 82 for detecting invalid residuals. The detector 47 generates a code phase offset τ and a carrier angle offset β from the measurement error vector 64 and correlations 66. The code phase offset τ is used to combine the early, prompt, and late correlations 66 into the I and Q maximized vector for adjusting the I and Q correlations for power alignment relative to code phase. The carrier angle offset β vector then is used to rotate the $I_{MAX}$ and $Q_{MAX}$ maximized vector to align signal power relative to carrier phase resulting in the $I_T$ and $Q_T$ transform vector that is the best estimate of $I_P$ and $Q_P$ correlations as determined by the measurement error vector 64. The lock indicators 76, 78, and 80 determined validity of the residuals of the measurement error vector 64 for the received I and Q correlations 66. In effect, the observation lock detector 47 functions to provide indicators 82 of the validity of the residual measurements in the measurement error vector 64. As such, the observation lock detector functions to provide a performance metric of the desired correct operation of the prefilter 46 that generates the measurement error vector 64 from the correlations 66 in the first instance.

It should now be apparent that various alternative implementations can be used. The I&Q maximizer 70 could be modified to select at each time point the early E, prompt P or late L I&Q correlations that the residual estimates predicts has the greatest signal to noise ratio so that the modified amplitude estimate and SNR can be computed in a consistent manner. The I&Q maximizer 70 could be removed altogether and the prompt I&Q could be used instead. The lock indicators 76, 78, and 80 can be used for indicating changes in the validity in the pseudorange error Δρ, pseudorange rate ρ̇, and pseudorange acceleration ρ̈ instead of carrier phase error φ, carrier frequency error φ', and code phase offset τ. Additionally, one or more of the lock detectors 76, 78, and 80 can be removed yielding a reduced set of indicators. The observation lock detector 70 could be applied to various types of spread spectrum signals such as the m-code signal. The observation lock detector 70 can take inputs from additional correlators. The observation lock detector 70 can take inputs from an m-code envelope. Those skilled in the art can make enhancements, improvements, and modifications to the invention, and these enhancements, improvements, and modifications may nonetheless fall within the spirit and scope of the following claims.

What is claimed is:

1. A part of a navigation system comprising,
   a navigation processor operative to receive signals derived from an antenna,
   the navigation processor adapted to implement a detector,
   the detector for receiving quadrature correlations and residuals generated from the quadrature correlations, the detector for providing validity indicators indicating the validity of the residuals,
   the detector comprising,
   a maximizer for receiving the quadrature correlations and the residuals and generating a code phase offset, the maximizer for combining the quadrature correlations into combined correlations using the code phase offset,
   a rotation matrices generator for receiving the residuals and generating a carrier phase angle offset,
   a rotator for rotating the combined correlations by the carrier phase angle offset into transformed correlations, and
   a lock detector for receiving the transformed correlations and for providing a validity indicator indicating validity of at least one of the residuals.

2. The system of claim 1, wherein
   the residuals are generated by a prefilter receiving the correlations,
   the quadrature correlations are generated by a correlator receiving demodulated quadrature samples, and
   the detector and prefilter and correlator are disposed in a navigation system.

3. The system of claim 1 wherein,
   the residuals are a measurement error vector comprising a carrier phase error and a carrier frequency error and a pseudorange error, and
   the indicators comprise a carrier phase indicator and a carrier frequency indicator and a pseudorange error indicator.

4. A part of a navigation system comprising,
   the navigation processor operative to receive signals derived from an antenna,
   the navigation processor adapted to implement a detector,
   the detector for receiving quadrature correlations and residuals, the detector for providing indicators indicating validity of the residuals, the detector comprising,
   a maximizer for receiving the quadrature correlations and the residuals, the maximizer for determining a code phase offset, the maximizer, weighting by the weights the quadrature correlations into weighted correlations, that are combined into maximized correlations,
   a rotation matrices generator for receiving the residuals and determining a carrier phase offset angle for generating rotational matrices,
   a rotator for rotating the maximized correlations into transformed correlations, and
   lock detectors for receiving the transformed correlations and providing the indicators.

5. The system of claim 4 further comprising,
   a noise modifier for receiving noise signal estimates and generating modified noise estimates, the modified noise estimates communicated to the lock detectors for determining the indicators.

6. The system of claim 4 further comprising,
   a noise modifier for receiving noise signal estimates and generating modified noise estimates, the modified noise estimates communicated to the lock detectors for determining the indicators, the noise signal estimates are a noise amplitude signal and noise SNR signal and the modified noise estimates are a modified noise amplitude and a modified noise SNR.

7. The system of claim 4 wherein,
   the maximizer comprises a table operator for determining weights as a function of the code phase offset, and
   the maximized correlations are I and Q maximized correlations.

8. The system of claim 4 wherein,
   the quadrature correlations are I and Q, correlations for each code replica used for correlating demodulated quadrature signals into the I and Q correlations.

9. The system of claim 4 wherein,
   the residual measurements are measurement errors from a prefilter that is selected from a group consisting of Kalman filters, batch filters, and particle filters.

10. The system of claim 4 wherein,
    the residual measurements are provided by a prefilter,
    the quadrature correlations are provided by a correlator correlating demodulated quadrature signals into the quadrature correlations by despreading the demodulated quadrature signals by a code replica,
    the indicators are communicated to an integration filter providing propagated signals for adjusting the code replica,
    the detector and prefilter and correlator and integration filter are disposed in a navigation processor for coherently tracking a code phase error between a spread spectrum code of the demodulated quadrature signals and the replica code.

11. The system of claim 4 wherein, the quadrature correlations comprise early and late and prompt I and Q correlations.

12. The system of claim 11 wherein,
    the lock detectors comprise,
    a carrier phase lock detector for providing a carrier phase validity indictor
    a carrier frequency lock detector for providing a carrier frequency lock validity indicator, and
    a code lock detector for providing a code lock validity indicator.

13. The system of claim 11 wherein the lock detectors comprise,
    a carrier phase lock detector for providing a carrier phase validity indicator,
    a carrier frequency lock detector for providing a carrier frequency lock validity indicator, and
    a code phase lock detector for providing a code lock validity indicator,
    the residuals comprise carrier phase and carrier frequency and pseudorange error, and
    the transformed vector comprises an $I_T$ inphase transformed vector and an IQ transformed vector,
    when all of the residuals are valid, the $I_T$ inphase transformed vector contains all of the signal power and the $Q_T$ quadrature transformed vector contains no signal power, the carrier phase lock detector provides a valid carrier phase indicator and the carrier frequency lock detector provides a valid carrier frequency indicator and code phase lock detector provides a valid code phase indicator, when the carrier phase is not accurate and the carrier frequency is accurate and when the $I_T$ inphase transformed vector and the $Q_T$ quadrature transformed vector both contain constant signal power having a sum greater than a first predetermined power value, the carrier phase lock detector provides an invalid indicator and the carrier frequency lock detector provides a valid indicator and the code phase lock detector provides a valid indicator, when the carrier phase and carrier frequency are inaccurate and the pseudorange error is accurate, and when the sum of the power of the $I_T$ inphase transformed vector and the $Q_T$ transformed vector is above the predetermined power value, the carrier phase lock detector provides an invalid indicator and the carrier frequency lock detector provides an invalid indicator and the code phase lock detector provides a valid indicator, and when the carrier phase and carrier frequency and pseudorange residuals are inaccurate, the carrier phase lock detector and the carrier frequency lock detector and the code phase lock detector all provide an invalid indicator.

14. The system of claim 11 further comprising
a noise modifier for receiving noise signal estimates and generating modified noise estimates, the modified noise estimates communicated to the carrier phase lock detector and the carrier frequency lock detector and the code phase lock detector for determining the indicators, the predetermined power value being dependent upon modified noise estimates.

15. The system of claim 13 wherein,
the pseudorange error is a function of the code phase offset.

16. A part of a navigation system comprising,
a navigation processor adapted to implement a detector,
the detector for receiving quadrature correlations and residuals generated from the quadrature correlations, the detector for providing validity indicators indicating the validity of the residuals,
the detector comprising,
 a maximizer for receiving the quadrature correlations and the residuals and generating a code phase offset, the maximizer for combining the quadrature correlations into combined correlations using the code phase offset,
 a rotation generator for receiving the residuals and generating a carrier phase angle offset,
 a rotator for rotating the combined correlations by the carrier phase angle offset into transformed correlations, and
 a lock detector for receiving the transformed correlations and for providing a validity indicator indicating validity of at least one of the residuals.

17. The system of claim 16, wherein
the residuals are generated by a prefilter receiving the correlations,
the quadrature correlations are generated by a correlator receiving demodulated quadrature samples, and
the detector and prefilter and correlator are disposed in a navigation system.

18. The system of claim 17 wherein,
the residuals are a measurement error vector comprising a carrier phase error and a carrier frequency error and a pseudorange error, and
the indicators comprise a carrier phase indicator and a carrier frequency indicator and a pseudorange error indicator.

* * * * *